United States Patent
Wild et al.

(10) Patent No.: US 10,979,980 B2
(45) Date of Patent: Apr. 13, 2021

(54) METHOD AND APPARATUS FOR PERFORMING PERMISSABLE AMPLIFYING OF ONE OR MORE DATA SYMBOLS USING AN OVERDRIVE REGIME

(71) Applicant: Alcatel Lucent, Nozay (FR)

(72) Inventors: Thorsten Wild, Stuttgart (DE); Xin Yu, Stuttgart (DE); Rana Ahmed Salem, Stuttgart (DE); Frank Schaich, Stuttgart (DE)

(73) Assignee: Alcatel Lucent, Nozay (FR)

(*) Notice: Subject to any disclaimer, the term of this patent is extended or adjusted under 35 U.S.C. 154(b) by 1 day.

(21) Appl. No.: 16/467,291

(22) PCT Filed: Nov. 30, 2017

(86) PCT No.: PCT/EP2017/080935
§ 371 (c)(1),
(2) Date: Jun. 6, 2019

(87) PCT Pub. No.: WO2018/104141
PCT Pub. Date: Jun. 14, 2018

(65) Prior Publication Data
US 2020/0084726 A1     Mar. 12, 2020

(30) Foreign Application Priority Data
Dec. 7, 2016 (EP) .................................. 16306630

(51) Int. Cl.
*H04W 52/14*    (2009.01)
*H04W 52/34*    (2009.01)
(Continued)

(52) U.S. Cl.
CPC ......... *H04W 52/146* (2013.01); *H04L 1/0001* (2013.01); *H04W 52/281* (2013.01);
(Continued)

(58) Field of Classification Search
CPC . H04W 52/146; H04W 52/18; H04W 52/283; H04W 52/38; H04W 52/383;
(Continued)

(56) References Cited

U.S. PATENT DOCUMENTS

| 2011/0306377 A1* | 12/2011 | Shibuya .............. H04W 72/082 455/513 |
| 2013/0044621 A1 | 2/2013 | Jung et al. .................... 370/252 |

(Continued)

FOREIGN PATENT DOCUMENTS

WO    WO 2010/065759 A2    6/2010

OTHER PUBLICATIONS

ETSI TS 136 211 V12.6.0 (Jul. 2015) (3GPP TS 36.211 V12.6.0 Release 12), "LTE; Evolved Universal Terrestrial Radio Access (E-UTRA): Physical channels and modulation", 138 pgs.
(Continued)

*Primary Examiner* — Joshua Kading
(74) *Attorney, Agent, or Firm* — Harrington & Smith

(57) ABSTRACT

The invention relates to a device for a radio communications system, the device including: a processing unit; a memory unit; and a transceiver including a transmitter provided with a power amplifier; wherein said device is configurable to: send a request to a base station of said communications system for permission of transmission of one or more data symbols, the one or more data symbols being amplified with the power amplifier in an overdrive regime; receive a grant for such transmission; amplify the one or more data symbols with the power amplifier of the transmitter in the overdrive regime; and transmit the one or more data symbols to the base station.

13 Claims, 3 Drawing Sheets

(51) Int. Cl.
   *H04W 52/36* (2009.01)
   *H04W 52/28* (2009.01)
   *H04W 52/38* (2009.01)
   *H04L 1/00* (2006.01)

(52) U.S. Cl.
   CPC ......... *H04W 52/283* (2013.01); *H04W 52/34* (2013.01); *H04W 52/343* (2013.01); *H04W 52/346* (2013.01); *H04W 52/365* (2013.01); *H04W 52/367* (2013.01); *H04W 52/38* (2013.01)

(58) Field of Classification Search
   CPC . H04W 52/04; H04W 52/343; H04W 52/281; H04W 52/286; H04W 52/346; H04W 52/34; H04W 52/365; H04W 52/367; H04L 1/0001
   See application file for complete search history.

(56) References Cited

U.S. PATENT DOCUMENTS

| | | | |
|---|---|---|---|
| 2013/0142098 A1 | 6/2013 | Kwon et al. | 370/311 |
| 2015/0005027 A1* | 1/2015 | Zeng | H04W 52/40 455/522 |
| 2019/0098650 A1* | 3/2019 | Tang | H04L 5/0051 |
| 2019/0268198 A1* | 8/2019 | Oketani | H04W 72/04 |
| 2020/0229107 A1* | 7/2020 | Venkatasubramanian | H04B 17/345 |

OTHER PUBLICATIONS

ETSI TS 123 203 V12.11.0 (Mar. 2016) (3GPP TS 23.203 V12.11.0 Release 12), "Digital cellular telecommunications system (Phase 2+); Universal Mobile Telecommunications System (UMTS); LTE; Policy and charging control architecture", 225 pgs.
3GPP TS 36.213 V12.6.0 (Jun. 2015), "3$^{rd}$ Generation Partnership Project; Technical Specification Group Radio Access Network; Evolved Universal Terrestrial Radio Access (E-UTRA); Physical layer procedures (Release 12)", 241 pgs.
ETSI TS 136 300 V12.7.0 (Oct. 2015) (3GPP TS 36.300 V12.7.0 Release 12), "LTE; Evolved Universal Terrestrial Radio access (E-UTRA) and Evolved Universal Terrestrial Radio Access Network (E-UTRAN); Overall description; Stage 2", 264 pgs.
ETSI TS 136 331 V12.7.0 (Oct. 2015) (3GPP TS 36.331 V12.7.0 Release 12), "LTE; Evolved Universal Terrestrial Radio Access (E-UTRA): Radio Resource Control (RRC); Protocol specification", 455 pgs.
Recommendation ITU-R M.2083-0 (Sep. 2015), "IMT Vision—Framework and overall objectives of the future development of IMT for 2020 and beyond", 21 pgs.

* cited by examiner

METHOD AND APPARATUS FOR PERFORMING PERMISSABLE AMPLIFYING OF ONE OR MORE DATA SYMBOLS USING AN OVERDRIVE REGIME

CROSS REFERENCE TO RELATED APPLICATION

This patent application is a U.S. National Stage application of International Patent Application Number PCT/EP2017/080935 filed Nov. 30, 2017, which is hereby incorporated by reference in its entirety, and claims priority to EP 16306630.1 filed Dec. 7, 2016.

FIELD OF THE INVENTION

The present invention relates to a device for a radio communications system, and to a method of operating such device.

The invention further relates to a base station for a radio communications system, and to a method of operating such base station.

BACKGROUND

One of the key upcoming service trends for communications systems, particularly cellular communications systems, such as e.g. fourth generation, 4G, or fifth generation, 5G, systems, is mission critical communication (MCC). Such kind of services (e.g. for industrial automation or remote controlling of objects) require a very high reliability and typically also low latencies. In conjunction with mobility support, this high reliability requires a good coverage.

Also, these trends and the resulting requirements are not limited to cellular communications systems, but also applicable to e.g. peer-to-peer communications systems, systems supporting ad-hoc communications, and the like.

Coverage limitations in conventional systems typically occur in the uplink, e.g. during data transmissions from a device to a base station. Conventional systems try to exploit various sources of diversity to address this issue. Time diversity (e.g., by using HARQ, hybrid-ARQ (automated repeat request)) is often not possible because of latency constraints. Frequency diversity depends on the nature of the radio channel. Spatial diversity depends on the number of available antennas and the decorrelation of their radio channels.

US 2013/044621 A1 discloses self-interference handling in a wireless communication terminal.

SUMMARY

In view of this, it is an object of the present invention to provide an improved device and method of operating such device which enable good coverage and high reliability particularly for transmissions to a base station, e.g. for uplink transmissions.

Further, it is an object of the present invention to provide an improved base station and method of operating such base station.

Regarding the abovementioned device, according to a first aspect, said object is achieved by said device comprising a processing unit, a memory unit, and a transceiver comprising a transmitter provided with a power amplifier, wherein said device is configurable to: send a request to a base station of said communications system for permission of transmission of one or more data symbols, the one or more data symbols being amplified with the power amplifier in an overdrive regime; receive a grant for such transmission; amplify the one or more data symbols with the power amplifier of the transmitter in the overdrive regime; and transmit the one or more data symbols to the base station.

This advantageously enables to transmit data symbols in uplink data transmissions with increased transmission power as compared to conventional devices due to overdriving said power amplifier. Moreover, as such transmissions are (preferably only) performed if granted by the base station, a coordinated manner of overdriving the power amplifier of the device is provided.

Also, according to an embodiment, mission critical communication (MCC) services and ultra-reliable low latency communication (URLLC) services, e.g. according to 3GPP standardization, may be provided with good coverage and high reliability.

According to further embodiments, it is also possible for the device to amplify the one or more data symbols with the power amplifier of the transmitter in the overdrive regime without requesting a permission as mentioned above.

According to a further embodiment, said one or more data symbols are part of a subframe, wherein said device is configurable to transmit the subframe comprising the one or more data symbols to the base station without exceeding a predetermined maximum average device output power per subframe (e.g., +23 dBm for an LTE system), where "average" refers to temporal averaging of the signal (e.g., for an interval of 1 ms). Thus, the criterion related to said predetermined maximum device output power per subframe is not violated.

According to a further embodiment, said device is configurable to overdrive the power amplifier of the transmitter for amplification of the one or more data symbols within the subframe and to mute transmission of remaining symbols within the subframe. Thus, comparatively important data symbols may profit from the overdriving according to the embodiments, and the chances for a reliable uplink data transmission are further increased, while reducing the risk of violating a predetermined admissible maximum average device output power per subframe due to muting said remaining symbols.

According to a further embodiment, the device is further configurable to send to the base station a priority indication related to the one or more data symbols, whereby the base station may be notified on the respective priority and may thus adapt its resource scheduling for related uplink transmissions, particularly also the granting mechanism for data symbols to be sent using the overdrive regime.

According to a further embodiment, the device is configurable to obey an in-band spectrum emission mask of said communications system for a transmission of data symbols to the base station which are amplified not using said overdrive regime for the power amplifier. And additionally, the device is configurable to obey a further spectrum emission mask of the communication system, the further spectrum emission mask being different than the in-band spectrum emission mask for a transmission of data symbols to the base station which are amplified using said overdrive regime. In other words, in an operating mode where no overdriving of the power amplifier is used, the device keeps to a predetermined in-band spectrum emission mask (SEM) of said communications system thus not producing any interference due to mask violations of said SEM. However, in a different operating mode, which may use the overdrive regime according to the embodiments, the device obeys a further spectrum emission mask. As an example, for such different operating mode, a more relaxed SEM may be provided.

According to a further embodiment, the further SEM may be defined by standardization and/or instructed to the device by the base station in response to its request for applying the overdrive regime.

According to an embodiment, the device may be a device for a cellular communications network, e.g. a terminal for a cellular communications network.

According to a further embodiment, the device may be a terminal compatible with the Long Term Evolution, LTE, or LTE Advanced, LTE-A, standard. Hence, the device may be configured to operate according to the LTE standard (3GPP, Third Generation Partnership Project, standardization Releases 8, 9) or LTE-A standard (3GPP standardization Releases 10, 11, 12 and above), with the exception of the application of the principle according to the embodiments. Likewise, according to an embodiment, the base station may be a base station for said cellular communications network, e.g. according to the LTE or LTE-A standard, and may correspondingly be compatible with the LTE or LTE-A standard, again with the exception of the application of the principle according to the embodiments.

Examples of standardization documents related to the LTE standard and the LTE-A standard as well as further systems as referred to herein are the following documents:
[1] 3GPP TS 36.211 V12.6.0, June 2015; Technical Specification Group Radio Access Network; Evolved Universal Terrestrial Radio Access (E-UTRA); Physical channels and modulation,
[2] 3GPP TS 36.300 V12.7.0, September 2015; Technical Specification Group Radio Access Network; Evolved Universal Terrestrial Radio Access (E-UTRA) and Evolved Universal Terrestrial Radio Access Network (E-UTRAN); Overall description,
[3] 3GPP TS 36.331 V12.7.0, September 2015; Technical Specification Group Radio Access Network; Evolved Universal Terrestrial Radio Access (E-UTRA); Radio Resource Control (RRC),
[4] 3GPP TS 36.213 V12.6.0, June 2015; Technical Specification Group Radio Access Network; Evolved Universal Terrestrial Radio Access (E-UTRA); Physical layer procedures,
[5] 3GPP TS 23.203 V12.11.0, December 2015; Technical Specification Service Architecture; Policy and charging control architecture,
[6] Recommendation ITU-R M.2083: IMT Vision—"Framework and overall objectives of the future development of IMT for 2020 and beyond".

A technical summary of 5G systems as referred to herein is provided by "Understanding 5G: Perspectives on future technological advancements in mobile", Analysis, December 2014; available in the World Wide Web at https://gsmaintelligence.com/research/?file=141208-5g.pdf&download from GSMA Intelligence.

It is noted that the principle according to the embodiments is also applicable to more recent (and also future) versions of these documents and standards, respectively.

It is noted that the principle according to the embodiments is also applicable to other system architectures and radio communications systems than cellular communications systems, where a base station can receive the mentioned request and issue a corresponding grant, respectively.

In addition to its compatibility with the LTE or LTE-A standard in accordance with the aforementioned embodiment, the device according to the embodiments is configurable and/or configured to perform the method according to the embodiments thus enhancing the conventional system by the functionality according to the embodiments, i.e. using the overdrive regime for amplifying said one or more data symbols.

In the context of the present application, the expression "configurable" defines that the device may include at least one operating mode in which the device is acting according to at least one aspect of the embodiments. I.e., according to some embodiments, the device may also comprise further operating mode(s) wherein no functionality in the sense of the embodiments, is provided. This also applies to the base station according to the embodiments.

Particularly, the expression "configurable" also includes a device which is, for example in a static configuration, configured to perform aspects of the embodiments. In addition, the expression "configurable" also includes a device which can be configured (e.g., by a further device such as a base station or other control mechanism, which may e.g. be implemented remotely or locally to the device) to perform aspects of the embodiments, but which comprises at least one operating mode in which it does not perform aspects of the embodiments.

As an example, according to an embodiment, a device may be provided which in a first operating mode acts as a conventional LTE- (or LTE-A- or 5G-) compatible terminal, but which, in a second operating mode, implements aspects according to the embodiments, e.g. employing the overdrive regime for uplink transmission of data symbols, wherein local or remote configuration may control whether the terminal assumes its first or second operation mode.

As an example, when considering a radio communications network using multi-carrier modulated signals, the one or more data symbols may comprise one or more multi-carrier modulated data symbols such as OFDM symbols or the like.

As a further example, in the context of an LTE system, the maximum admissible average signal power for the transmission of data symbols of a subframe is specified to +23 dBm, and when applying the principle according to the embodiments, at least some data symbols may be transmitted using a signal power that is greater than +23 dBm.

According to a further preferred embodiment, the device is configurable to use said overdrive regime for amplification depending on priority information which characterizes a priority of information associated with said one or more data symbols. According to an embodiment, specific priority information may be associated with a specific service handled by the device.

According to a further embodiment, said device is configurable to perform at least one of the following actions, preferably in order to alter a transmission power for uplink transmissions or in combination with altering said transmission power: modifying a power backoff parameter, modifying a clipping threshold of an RF pre-processing process performed by the transceiver, modifying waveform parameters characterizing at least one signal waveform to be used for said uplink transmissions.

According to a further aspect, the device according to the embodiments may e.g. comprise or constitute at least one of the following: end user equipment, LTE UE (user equipment), M2M (machine-to-machine) device, Smartphone, Mobile terminal, sensor with radio transceiver, 5G transceiver, 5G radio terminal with device-to-device communication support.

According to an aspect, one or more devices according to the embodiments may be present in a radio cell of a cellular communications network, together with one or more conventional, e.g. LTE or LTE-A capable, devices or terminals, respectively. Advantageously, the conventional devices or terminals are not required to be modified in any way to enable the principle according to the embodiments to be applied to the cellular communications network.

Further embodiments feature a method of operating a device within a communication system, the method comprising: —sending, via a transmitter of the device, a request to a base station of said communications system for permission of transmission of one or more data symbols, the one or more data symbols being amplified with a power amplifier of the transmitter in an overdrive regime; —receiving a grant for such transmission; —amplifying the one or more data symbols with the power amplifier of the transmitter in the overdrive regime; and—transmitting the one or more data symbols.

According to an embodiment, said one or more data symbols are part of a subframe, e.g. an OFDM subframe in case of a communications system using OFDM subframes, and the subframe comprising the one or more data symbols is transmitted to the base station without exceeding a predetermined maximum average device output power per subframe.

According to a further embodiment, the power amplifier of the transmitter is overdriven to amplify the one or more data symbols within the subframe, wherein the remaining symbols within the subframe are muted.

According to a further embodiment, said method may further comprise sending to the base station a priority indication related to the one or more data symbols.

Further embodiments feature a base station for a radio communications system, wherein said base station comprises: —a processing unit; —a memory unit; and—a transceiver; wherein said base station is configurable to: —receive a request from a device for permission of transmission of one or more data symbols while overdriving a power amplifier of a transmitter of the device; —verify if such permission can be granted; and—if such permission can be granted, transmit an indication to the device that the transmission of the one or more data symbols while overdriving a power amplifier of a transmitter of the device is allowed.

According to an embodiment, said base station is further configurable to receive a priority indication related to the requested transmission of the one or more data symbols, wherein verifying if such permission can be granted is, at least partially, based on said priority indication.

According to an embodiment, said base station is further configurable to—schedule frequency resources for the one or more data symbols by at least one of selecting frequency resources that have a non-vanishing predetermined minimum frequency spacing from a carrier band edge and scheduling frequency resources for uplink transmissions such that at least one guard carrier is provided adjacent to the frequency resources scheduled for the one or more data symbols; and—sending information regarding the frequency resources scheduled for the one or more data symbols to the device.

Further embodiments feature a method of operating a base station within a communication system, the method comprising: —receiving a request from a device for permission of transmission of one or more data symbols while overdriving a power amplifier of a transmitter of the device; —verifying if such permission can be granted; and—if such permission can be granted, transmitting an indication to the device that the transmission of the one or more data symbols while overdriving a power amplifier of a transmitter of the device is allowed.

According to an embodiment, said method further comprises receiving a priority indication related to the requested transmission of the one or more data symbols, wherein said verifying if such permission can be granted is, at least partially, based on said priority indication.

According to a further embodiment, said method further comprises: —scheduling, for the one or more data symbols, frequency resources that have a non-vanishing predetermined minimum frequency spacing from a carrier band edge; and—sending information regarding the scheduled frequency resources to the device. This way, violation of spectral masks provided by a respective communications standard the communications system is adhering to may be prevented.

According to a further embodiment, said method further comprises: —scheduling frequency resources for uplink transmissions such that at least one guard carrier is provided adjacent to the frequency resources scheduled for the one or more data symbols, and—sending information regarding the frequency resources scheduled for the one or more data symbols to the device. By providing the guard carrier(s), it is ensured that no further frequency resources, which are adjacent to the scheduled frequency resources for the device according to the embodiments, will be scheduled, because these further frequency resources could possibly be affected by interference resulting from the use of an "excessive" signal power resulting from overdriving the amplifier according to the embodiments.

According to further embodiments, the functionality of the embodiments explained above with reference to a base station may also at least partly be located within (further) network equipment of a radio communications system.

BRIEF DESCRIPTION OF THE FIGURES

Further features, aspects and advantages of the present invention are given in the following detailed description with reference to the drawings in which.

DESCRIPTION OF THE EMBODIMENTS

Figure 1:
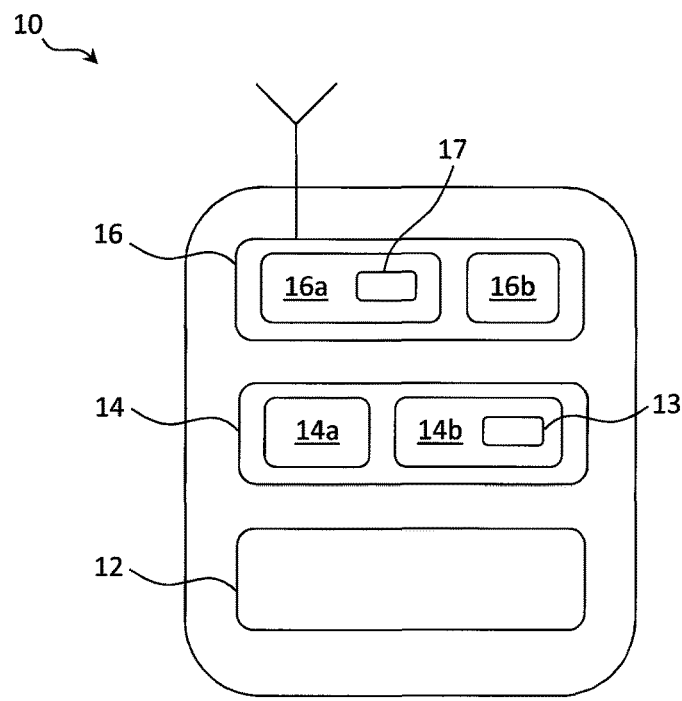
FIG. 1 schematically depicts a device for a radio communications system according to an embodiment, FIG. 2 schematically depicts a radio communications system with a device according to an embodiment, FIG. 3A schematically depicts a simplified flow-chart of a method of operating a device according to an embodiment, FIG. 3B schematically depicts a simplified flow-chart of a method of operating a device according to a further embodiment, FIG. 4 schematically depicts a base station for a radio communications system according to an embodiment, FIG. 5 schematically depicts a simplified flow-chart of a method of operating a base station according to an embodiment, FIG. 6 schematically depicts components of a transmitter of a device according to an embodiment, and FIG. 7 schematically depicts a gain of a power amplifier over an input power according to an embodiment.

FIG. 1 schematically depicts a device 10 for a radio communications system according to an embodiment. The device 10 comprises a processing unit 12 configured to execute a computer program 13, a memory unit 14, and a transceiver 16.

According to an embodiment, the processing unit 12 comprises a digital signal processor (DSP) or general purpose microprocessor or correspondingly configured field programmable gate array (FPGA) or an ASIC (application specific integrated circuit) or the like.

According to a further embodiment, the memory unit 14 comprises a RAM (random access memory) 14*a* and/or ROM (read only memory) 14*b* and/or other forms of volatile and/or non-volatile memory devices. In one or more memory devices of the memory unit 14, a computer program 13 for executing the steps according to one or more of the present embodiments may be provided.

The transceiver 16 comprises a transmitter 16*a* and a receiver 16*b* for data transmission with a further device such as e.g. a base station of a radio communications system. The transmitter 16*a* comprises a power amplifier 17 for amplifying signals to be transmitted.

Figure 2:
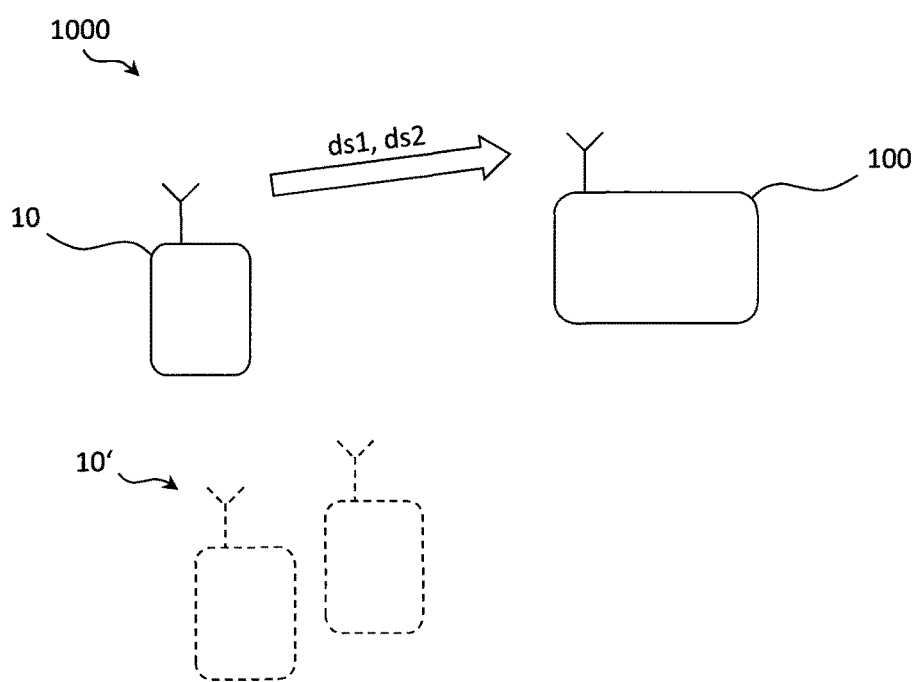

FIG. 2 schematically depicts a radio communications system 1000 with a device 10 according to an embodiment. The communications system 1000 further comprises a base station 100 serving device 10 and optionally also further devices 10'.

Although the principle according to the embodiments is not limited to cellular radio communications systems, for the further exemplary description it is assumed that the radio communications system 1000 of FIG. 2 is a cellular communications system such as e.g. defined by the LTE or LTE-A standard. Insofar, for the further description, it is assumed that the base station 100 and the devices 10, 10' are compatible with the LTE or LTE-A standard, the devices 10, 10' e.g. representing terminals 10, 10' (also denoted as "UE") of the system 1000. Correspondingly, the base station 100 may exchange data with the UEs 10, 10' by means of downlink and/or uplink data transmissions in a per se known manner.

In contrast to the further UEs 10', which, according to some embodiments, may be conventional LTE- or LTE-A compatible devices, the device 10, according to an embodiment, is enhanced regarding its functionality with respect to the current LTE- or LTE-A standards to improve reliability for uplink data transmissions from the device 10 to the base station 100.

According to a first aspect, the device 10 is configurable and/or configured to send a request to the base station 100 of said communications system 1000 for permission of transmission of one or more data symbols ds1, ds2, the one or more data symbols being amplified with the power 17 amplifier (FIG. 1) in an overdrive regime, receive a grant for such transmission from the base station 100, amplify the one or more data symbols ds1, ds2 with the power amplifier 17 of the transmitter 16*a* in the overdrive regime, and transmit the one or more data symbols ds1, ds2 to the base station 100.

This advantageously enables to transmit specific data symbols ds1, ds2 with an increased transmission power—as compared to conventional systems—so that the chances for proper signal reception at the base station 100 are increased for said specific data symbols ds1, ds2. This mechanism may e.g. be used for specific services handled by the device 10, for example particularly important services such as MCC or URLLC services.

For other data symbols, the overdrive regime is not required to be used. For these data symbols, a conventional transmission power may be used according to further embodiments.

Advantageously, said overdrive regime is preferably only used by the device 10 if granted by the base station 100 upon said request of the device 10. This way, the base station 100 is notified on a planned transmission with increased transmission power and may take this into consideration in resource scheduling processes.

Figure 3A:
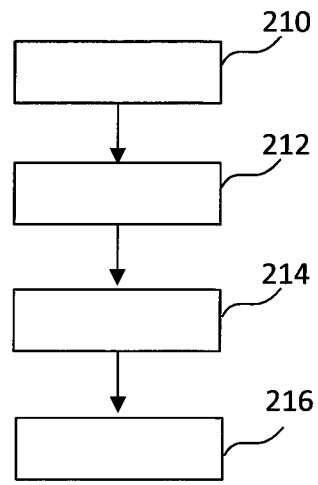

FIG. 3A schematically depicts a simplified flow-chart of a method of operating the device 10 according to an embodiment. In a first step 210, the device 10 (FIG. 2) sends a request to a base station 100 for permission of transmission of one or more data symbols, the one or more data symbols being amplified with the power amplifier in an overdrive regime. In step 212, the device 10 receives a grant for such transmission. In step 214, the device 10 amplifies the one or more data symbols with the power amplifier 17 (FIG. 1) of the transmitter 16*a* in the overdrive regime, and in step 216 the device 10 transmits the one or more data symbols to the base station 100.

According to a further embodiment, said one or more data symbols ds1, ds2 (FIG. 2) are part of a subframe, e.g. an OFDM subframe, and said device 10 is configurable to transmit the subframe comprising the one or more data symbols ds1, ds2 to the base station 100 without exceeding a predetermined maximum average device output power per subframe.

Figure 3B:
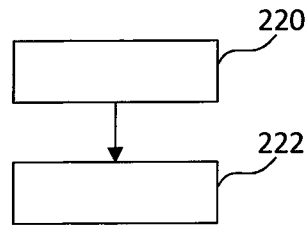

According to a further embodiment, this may e.g. be attained by overdriving the power amplifier 17 (FIG. 1) of the transmitter 16*a* for amplification of the one or more data symbols ds1, ds2 within the subframe and by muting transmission of remaining data symbols within the subframe. As an example, muting a transmission of remaining symbols may comprise setting to zero the amplitude of a signal corresponding with said remaining symbols. This embodiment is further illustrated by the flow-chart of FIG. 3B. In step 220, the one or more data symbols ds1, ds2 within the subframe are amplified with the power amplifier 17 of the transmitter 16*a* in the overdrive regime, and in step 222, the transmission of remaining data symbols within the (same) subframe is muted.

Figure 7:
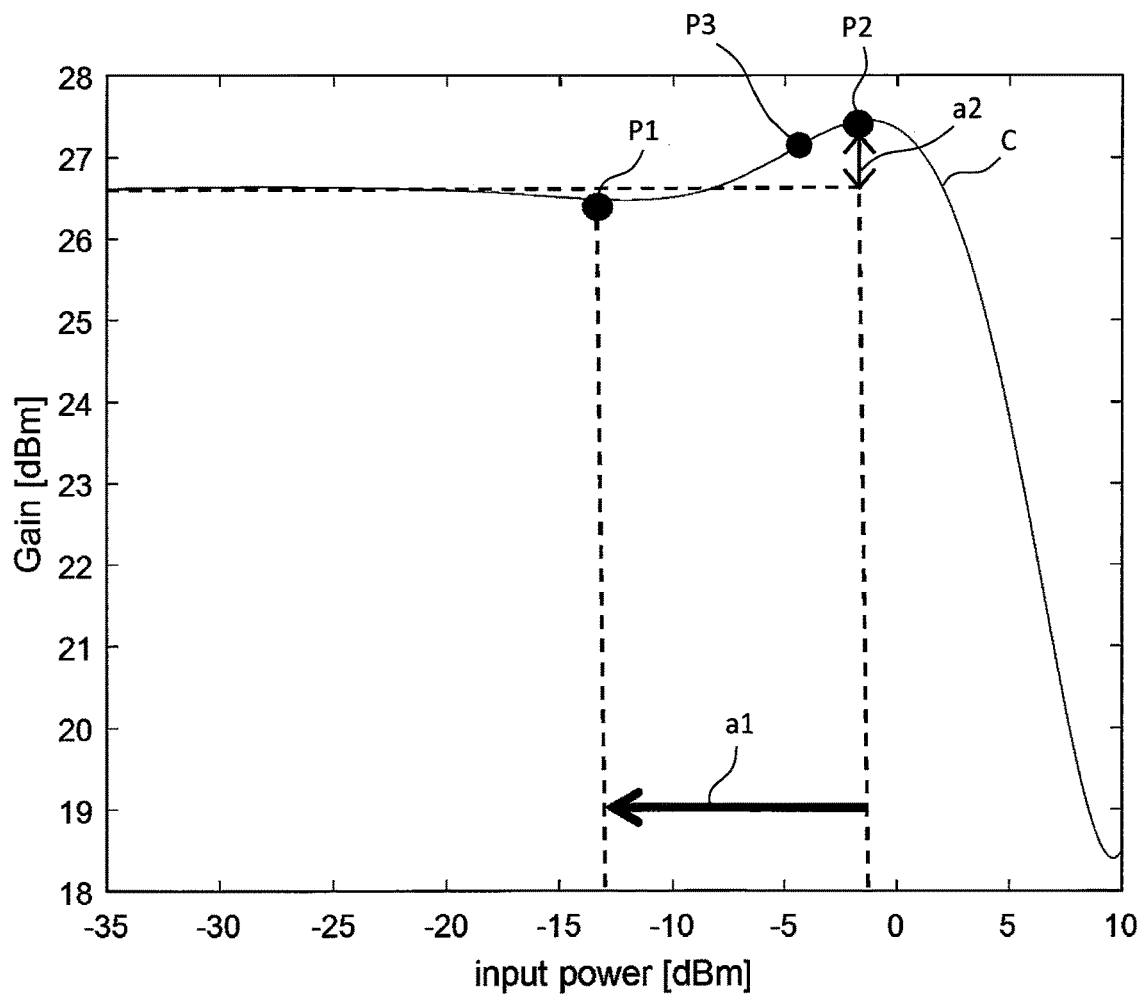

FIG. 7 schematically depicts a gain in dBm of the power amplifier 17 (FIG. 1) over an input power according to an embodiment. As can be seen from FIG. 7, the gain curve C is basically flat for input power values of up to about −13 dBm. Hence, with conventional devices, the first operating point P1 may be chosen for amplification of a signal associated with data symbols to be transmitted to the base station in an uplink direction. Said first operating point P1 is characterized by a specific first backoff value indicated by arrow a1 from the second operating point P2, which indicates the 1 dB expansion point. A gain difference is symbolized by arrow a2.

For the overdrive regime as proposed according to the principle of the embodiments, a smaller backoff value—as seen from the second 1 dB expansion point P2—may be chosen, which e.g. leads to the third operating point P3.

In other words, according to a further embodiment, said device 10 (FIG. 2) is configurable to modify a power backoff parameter, e.g. the backoff value a1 as explained above, to implement the overdrive mode.

Embodiments of the invention are not limited to power amplifiers with a gain curve comprising an expansion point. It will be understood that a similar scenario may be described for power amplifiers with a compression point instead of an expansion point, i.e. power amplifiers with merely a monotonic decrease of power amplifier gain.

According to an embodiment, modifying the power backoff parameter may comprise reducing its power backoff value in the power amplifier 17 of the transmitter 16*a* (FIG. 1) by several dB, cf. point P3 of FIG. 7. In this context, FIG.

6 schematically depicts some components of the transmitter 16a, inter alia the power backoff parameter 16a'.

While in some embodiments this modification of the power backoff value may increase nonlinearities and error vector magnitude (EVM) and may yield worse spectral properties (e.g. regarding spectral mask fulfillment behavior), this variant is particularly beneficial in that it enables the device 10 (FIG. 2) to efficiently modify its transmission power to attain the overdrive operation in the sense of the embodiments. Also, for transmissions of data symbols e.g. related to services that do not require a particularly high reliability, for example, the device 10 may change back its power backoff value, e.g. by increasing by several dB, for example assuming the first operating point P1 of FIG. 7.

According to further embodiments, the device 10 may also perform at least one of the following actions, preferably in order to alter a transmission power for uplink transmissions or in combination with altering said transmission power for uplink transmissions: modifying a clipping threshold of an RF pre-processing process performed by the transceiver 16 (FIG. 1), modifying waveform parameters characterizing at least one signal waveform to be used for said uplink transmissions.

Figure 6:
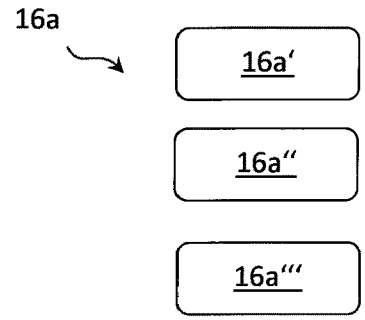

According to a further embodiment, a clipping threshold of a radio frequency (RF) digital pre-processing stage 16a" (FIG. 6) of said transmitter 16a of the device 10 (FIG. 1) may be adjusted such that more clipping noise is tolerated.

According to a further embodiment, waveform parameters 16a''' (FIG. 6) may be adjusted in order to take into account or at least partly compensate worse signal properties that may result from e.g. modifying the backoff value as mentioned above. According to an embodiment, when a power amplifier (PA) 17 of the transmitter 16a is impairing spectral properties of the signal anyway, windowing or filtering may be skipped at the device 10, increasing a multi-path protection budget and reducing complexity.

Figure 4:
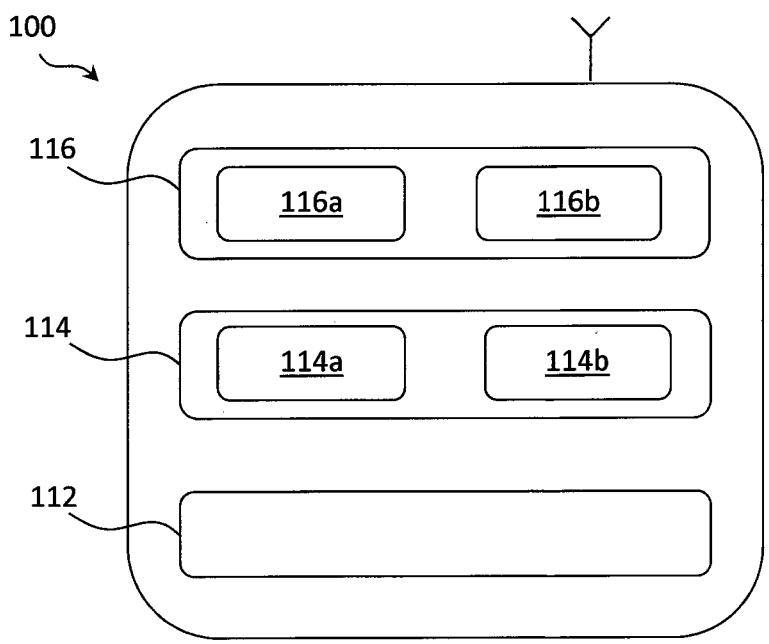

FIG. 4 schematically depicts a base station 100 for a radio communications system 1000 according to an embodiment. For example, the base station 100 of FIG. 2 may comprise the structure depicted by FIG. 4. The base station 100 comprises a processing unit 112, a memory unit 114, and a transceiver 116.

Similar to the structure of the device 10 depicted by FIG. 1, according to an embodiment, the processing unit 112 (FIG. 4) of the base station 100 comprises a DSP or general purpose microprocessor or correspondingly configured FPGA or an ASIC or the like.

According to a further embodiment, the memory unit 114 of the base station 10 comprises a RAM 114a and/or ROM 114b and/or other forms of volatile and/or non-volatile memory devices. In one or more memory devices of the memory unit 114, a computer program (not depicted) for executing the steps according to one or more of the present embodiments may be provided.

The base station 100 further comprises a transceiver 116 having a transmitter 116a and a receiver 116b for data transmission with a further device 10, 10'.

Figure 5:
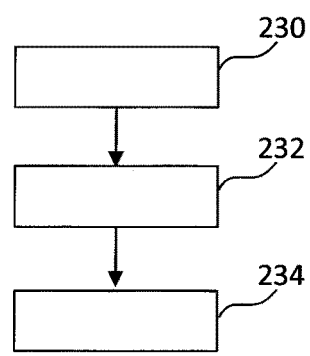

In the following, a method of operating the base station 100 is explained with reference to the flow-chart of FIG. 5. According to an embodiment, in a first step 230, the base station 100 (FIG. 2) receives a request from a device 10 for permission of transmission of one or more data symbols ds1, ds2 while overdriving a power amplifier 17 (FIG. 1) of a transmitter 16a of the device 10. In step 232 (FIG. 5) the base station 100 verifies if such permission can be granted (e.g., depending on a cell load and/or interference situation and/or further operational parameters of the base station 100 and/or devices 10, 10' served by said base station 100), and, if such permission can be granted, in step 234 the base station 100 transmits an indication to the device 10 that the transmission of the one or more data symbols ds1, ds2 while overdriving the power amplifier 17 of the transmitter 16a of the device 10 is allowed. In this case, the device 10 may control its PA (FIG. 1) to employ the third operating point P3 (FIG. 7) for the overdrive mode intended to be used for transmission of said one or more data symbols ds1, ds2 to the base station 100.

In some embodiments, the base station indicates that the device 10 is allowed to transmit the one or more data symbols ds1, ds2 while overdriving the power amplifier 17 with time constraints. For example, the base station 100 may indicate that overdriving is only allowed for a predetermined period of time and/or at predetermined times. The predetermined period of time may be controlled by means of a timer. Such timer may be configured to run in a processor of the device 10, e.g. processing unit 12, and/or in a processor of the base station 100, e.g. processing unit 112.

According to an embodiment, the base station is further configurable to receive a priority indication related to the requested transmission of the one or more data symbols ds1, ds2, wherein verifying if such permission can be granted is, at least partially, based on said priority indication. Thus, the base station 100 may take into consideration the priority for verifying if such permission can be granted. This may be particularly beneficial if the base station receives different requests of this type from a plurality of devices 10, 10' (FIG. 2).

According to a further embodiment, the base station 100 is further configurable to: —schedule frequency resources for the one or more data symbols ds1, ds2 (FIG. 2) by at least one of selecting frequency resources that have a non-vanishing predetermined minimum frequency spacing from a carrier band edge and scheduling frequency resources for uplink transmissions such that at least one guard carrier is provided adjacent to the frequency resources scheduled for the one or more data symbols; and—sending information regarding the frequency resources scheduled for the one or more data symbols to the device 10. This way, it is ensured that spectral mask requirements are not violated although using the overdrive regime for the amplifier 17 for said one or more data symbols ds1, ds2.

According to further embodiments, for example, if more than one device 10 of the system 1000 according to FIG. 2 operates in accordance with the embodiments, the base station 100 may perform an optimization process which is e.g. directed to determining which one(s) of a plurality of requesting devices 10 may be allowed to operate its (their) PA 17 in the overdrive regime.

In the following, various aspects and embodiments are disclosed in further detail.

The principle according to the embodiments provides a possibility for deliberately overdriving the power amplifier 17 of the transmitter 16a of the device 10. According to a preferred embodiment, this is done in a managed, signaled and controlled way, and also preferably for a limited time. The control and management of such overdriving may e.g. be performed by the base station 100 as explained above with reference to FIG. 5.

According to a further embodiment, service-related information may be used to label a device 10, e.g. a UE, as eligible for PA overdriving. E.g., according to an embodiment, the UE 10 (FIG. 2) sends an indicating signaling information to the base station 100 in order to signal that the current uplink traffic (waiting for uplink transmission) is of very high priority, which can e.g. be confirmed by the base station 100.

The base station 100 then can indicate to the UE (preferably in conjunction with a scheduling grant, which is transmitted in a per se known manner to the UE 10) whether it is allowed to overdrive its PA—and optionally also— under which kind of conditions it is allowed to do so.

According to an embodiment, conditions under which overdriving the PA 17 or using a usually inadmissibly high transmit power level may be granted may e.g. occur if the maximum admissible transmit power the device 10 is originally designed for is expected to be not sufficient for the upcoming transmission to be successful. According to some embodiments, such determination may be made by the device 10 and/or the base station 100, preferably depending on a history of previous uplink data transmissions.

According to a preferred embodiment, the base station 100 may schedule the UE 10 not directly at the carrier band edge in order to prevent violating spectral masks. Instead, guard frequency band(s) or guard subcarriers may be provided.

According to a further embodiment, the base station 100 may also leave guard subcarriers to the frequency resources scheduled for other devices 10' (FIG. 2) to mitigate inter-carrier interference that may result from non-linearities effected by PA overdriving according to some embodiments.

According to a further embodiment, the device 10 may apply less complex modulation and coding schemes (e.g. binary phase shift keying, BPSK), especially for such data symbols, which may be associated with comparatively important services, which further increases the chances for its uplink transmissions to be successful.

According to a further embodiment, overdriving the PA may be restricted to specific time intervals in order not to impact on overall cell spectral efficiency for too long. Such time intervals may be provided by the device 10 and/or the base station 100.

Also, according to further embodiments, the base station 100 may decide to disallow the PA overdriving, e.g. only allowing it for a limited amount of time for a few high priority UEs 10, but not for other UEs 10'.

A further aspect of the embodiments relates to shifting distortions that may arise from the PA 17 being overdriven (i.e., using a higher average transmission power) into frequency portions of the carrier not being used by a current transmission. In other words, high priority transmissions related to e.g. mission-critical communications services may be enabled at the cost of at least temporarily affecting or even prohibiting other UL transmissions, which are related to services with lower priority.

According to a further embodiment, techniques for shaping a clipping noise such as e.g. content-aware clipping may be applied by the device 10. By doing so, clipping noise, which may be increased by PA overdriving, may at least partly be shifted to frequency ranges or subbands, respectively, with lower priority services. Those subbands may be indicated by the base station 100 via downlink control signaling to the devices 10, 10'.

According to a further embodiment, a device such as the UE 10 (FIG. 2) may employ the principle according to the embodiments in order to increase a reliability for its uplink data transmissions to the base station 100. For example, if the UE 10, which may be a mobile terminal, moves to an edge of a radio cell of the system 1000, where the radio coverage conditions usually are worse than in a cell center region, it may use the principle according to the embodiments for transmitting data symbols e.g. associated with high priority services.

According to a particularly preferred embodiment, the UE 10 may use the overdrive regime for only some symbols of a specific subframe, whereas for other symbols of said same subframe no overdriving may be used. According to further embodiments, it is also possible to use a further reduced transmission power (or even zero transmission power, i.e. muting) for some data symbols of a subframe which comprise reduced priority in contrast to those data symbols, which comprise high priority.

As an example, in 3GPP TS 36.101 it is defined, that a maximum UE output power is measured at least over one subframe (1 ms). If the UE moves to the edge of a cell and the radio conditions become bad, according to the principle of the embodiments, the PA 17 of the transmitter 16*a* of the UE 10 (FIG. 2) may be operated in an overdrive mode to increase the output power by another few dBs within a very short time range, wherein said short time range is preferably smaller than 1 ms. This is especially suitable for URLLC use cases. In other words, according to some embodiments, the device 10 is able to boost all the (admissible) energy of one subframe into only several symbols of said subframe, and the remaining symbols in this subframe are muted (e.g., set to 0), in order not to violate the above-mentioned maximum average output power requirement. This embodiment advantageously enables to employ the principle according to the embodiments, while at the same time not violating maximum average output power requirements as standardized for the respective communications system 1000.

According to some aspects of the embodiments, especially during a PA overdrive operation, where selected data symbols ds2 (FIG. 2) associated with a particularly important service are transmitted with a comparatively high average transmission power, the power amplifier 17 of the transmitter 16*a* (FIG. 1) will potentially be more strongly operated in a nonlinear region, which may result in more distortions of an amplified transmission signal. Regarding this hardware aspect, according to further embodiments, different strategies are proposed in the following, said strategies inter alia enabling to perform optimization processes.

According to one aspect, reducing a peak to average power ratio (PAPR) is possible. According to one embodiment, a reduction of PAPR is possible by changing a modulation scheme from higher order QAM to QPSK or even BPSK.

According to further embodiments, one can further optimize a waveform used for signal transmission for low PAPR purpose, e.g. by adjusting a subcarrier spacing such that less carriers are used in parallel, whereby PAPR is reduced.

According to further embodiments, a waveform used for signal transmission may even be switched to single carrier (SC) transmission with even less PAPR.

According to further embodiments, one can also use clipping algorithms to reduce the PAPR, and a clipping threshold value may e.g. depend on the PA characteristics, channel conditions, and so on.

According to applicant's analysis, clipping algorithms may take into account an adjusted PA operation point P3 (FIG. 7) in the following way: a) a clipping threshold may be reduced b) since it is expected that in the overdriven mode a PA generates more out of band distortions, one approach according to a further embodiment is to optimize a clipping noise filter of the transmitter 16*a* in such a manner that some of the clipping noise energy does not fall in a signal band, but out of the signal band, which will be overlapped by PA nonlinear effects. In this way, the in-band distortion caused by clipping algorithm can be reduced and hence a lower bit error rate (BER) at receiver side will be achieved. c) As mentioned above an active shaping of the clipping noise can be carried out using content-aware clipping (cf. e.g. EP2485477) accumulating all clipping noise outside of the subbands of high priority users or devices 10 which have to transmit data symbols ds2 associated with services having high priority, respectively. According to a further embodiment, an information indicating which frequency bands may be used to dump clipping noise to may be broadcasted by the base station 100.

According to further embodiments, a protection overhead for reducing inter-symbol interference (ISI) may be removed.

According to some embodiments, the device 10 may only boost (i.e., use the higher, potentially inadmissible, average transmission power) every n-th data symbol in a transmission time interval (TTI), with e.g. n=2 or n=3, while not transmitting anything on the remaining symbols of the same TTI. This has the effect that no two successive symbols of said TTI are both "turned on" (e.g., have a non-vanishing amplitude), so that ISI may be avoided and the cyclic prefix can e.g. be removed from the signal given that a CP-OFDM receiver is aware of the absence of the CP through e.g. signaling information.

So, according to a further embodiment, a receiver 116b (FIG. 4) of the base station 100 may treat a received uplink signal as described above as a ZP (zero prefix)-OFDM (orthogonal frequency division multiplex) signal and use appropriate receiver techniques. Consequently, the pure data signal would have more power.

According to a further embodiment, in case the waveform used by the device 10 for uplink transmissions is UF (universal filtered)-OFDM (e.g., a combination of zero postfix and sub-band filter), as a shift in a PA operation point anyway worsens a spectral localization of the signal, a filter may be set to a unit amplitude spike, so is in fact turned off, which will save computational effort.

In this case, no prior signaling is needed to the receiver side, and this measure concentrates the signal in time and allows for even higher instantaneous signal amplitudes for the same average power within 1 ms (millisecond).

The principle according to the embodiments advantageously enables to increase the transmission reliability for the uplink direction.

The principle according to the embodiments is particularly beneficial for mission critical use cases preventing the loss of coverage.

The principle according to the embodiments enables to attain the ultra-high reliability targets of upcoming 5G systems, e.g. 3GPP New Radio.

According to a further embodiment, the device 10 (FIG. 1) is further configurable to obey an in-band spectrum emission mask of said communications system 1000 (FIG. 2) for a transmission of data symbols to the base station 100 which are amplified not using said overdrive regime for the PA 17 (FIG. 1). Additionally, the device 10 may be further configurable to a further spectrum emission mask of said communications system 1000 for a transmission of data symbols ds1, ds2 to the base station 100 which are amplified using said overdrive regime. In other words, in an operating mode where no overdriving of the power amplifier is used, the device 10 keeps to a predetermined in-band spectrum emission mask (SEM) of said communications system thus not producing any interference due to mask violations of said SEM. In a different operating mode, which may use the overdrive regime according to the embodiments, the device 10 obeys the further SEM of the communication system 1000 being different than the in-band SEM.

As an example, for the operating mode using the overdrive regime, the further SEM may be a more relaxed SEM i.e. some interference may be allowed in regions for which interference is disallowed in view of the in-band SEM. In other words, in such scenario transmission of the one or more data symbols ds1, ds2 is performed while violating the in-band SEM, but not violating the further SEM.

The further SEM may be defined by standardization and/or instructed to the device 10 by the base station 100 in response to its request for applying the overdrive regime.

In some embodiments, use of the further SEM is, explicitly or implicitly, granted by the base station 100 in response to a device request to operate in the overdrive mode. Preferably usage of the further SEM is limited, e.g. by the base station 100, to a predetermined number of devices and/or for a limited amount of time.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

At least parts of the above described radio communications network including base stations could be implemented using network functions virtualization (NFV). NFV is a network architecture that makes use of technologies of computer virtualization. Entire network equipment like base stations or parts thereof or part of their functions can be virtualized using software building blocks that may connect, or interact, to create communication services. A virtualized network function of e.g. a base station may include at least one virtual machine running different software and processes, on top of standard high-volume servers, switches and storage, or a cloud computing infrastructure, instead of having customized hardware appliances for each network function. As such a base station function may be implemented using a computer program product embodied on a non-transitory computer readable medium for performing operations, wherein the computer program product comprises instructions, that when executed by a processor, perform the operations of the specific base station function.

The invention claimed is:

1. A device comprising:
a processing unit;
a memory unit; and
a transceiver comprising a transmitter provided with a power amplifier;
the processing unit, the memory unit, and the transceiver configured to cause the device, for a radio communications system, to:
send a request to a base station of said communications system for permission of transmission of one or more data symbols, the one or more data symbols being amplified with the power amplifier in an overdrive regime;
receive a grant for such transmission;
amplify the one or more data symbols of a subframe with the power amplifier of the transmitter in the overdrive regime and mute transmission of at least one remaining data symbol within the subframe; and
transmit the one or more data symbols to the base station.

2. The device according to claim 1, wherein the processing unit, the memory unit, and the transceiver are configured to cause said device to transmit the subframe comprising the one or more data symbols to the base station without exceeding a predetermined maximum average device output power per subframe.

3. The device according to claim 1, wherein the processing unit, the memory unit, and the transceiver are configured to cause the device to obey an in-band spectrum emission mask of said communications system for a transmission of data symbols to the base station which are amplified not using said overdrive regime for the power amplifier, and wherein said the processing unit, the memory unit, and the transceiver are configured to cause said device to obey a further spectrum emission mask of said communications system different from the in-band spectrum emission mask for a transmission of data symbols to the base station which are amplified using said overdrive regime.

4. A method, comprising:
operating a device within a communication system, comprising:
sending, via a transmitter of the device, a request to a base station of said communications system for permission of
transmission of one or more data symbols of a subframe, the one or more data symbols being amplified with a power amplifier of the transmitter in an overdrive regime;
receiving a grant for such transmission;
amplifying the one or more data symbols with the power amplifier of the transmitter in the overdrive regime and muting transmission of at least one remaining data symbol within the subframe; and
transmitting the one or more data symbols.

5. The method according to claim 4, wherein the subframe comprising the one or more data symbols is transmitted to the base station without exceeding a predetermined maximum device output power per subframe.

6. The method according to claim 4, further comprising sending to the base station a priority indication related to the one or more data symbols.

7. A base station, comprising:
a processing unit;
a memory unit; and
a transceiver;
the processing unit, the memory unit, and the transceiver configured to cause, for a radio communications system, the base station to:
receive a request from a device for permission of transmission of one or more data symbols of a subframe while overdriving a power amplifier of a transmitter of the device;
verify if such permission can be granted; and
based on permission being granted, transmit an indication to the device that the transmission of the one or more data symbols for overdriving a power amplifier of a transmitter of the device is allowed, wherein the overdriving is to amplify the one or more data symbols with the power amplifier and mute at least one remaining data symbol within the subframe.

8. The base station according to claim 7, wherein the processing unit, the memory unit, and the transceiver are configured to cause the base station to receive a priority indication related to the requested transmission of the one or more data symbols, and wherein verifying if such permission can be granted is, at least partially, based on said priority indication.

9. The base station according to claim 7, wherein the processing unit, the memory unit, and the transceiver are configured to cause the base station to:

schedule frequency resources for the one or more data symbols by at least one of selecting frequency resources that have a non-vanishing predetermined minimum frequency spacing from a carrier band edge and scheduling frequency resources for uplink transmissions such that at least one guard carrier is provided adjacent to the frequency resources scheduled for the one or more data symbols; and send information regarding the frequency resources scheduled for the one or more data symbols to the device.

10. A method comprising:

operating a base station within a communication system, comprising:

receiving a request from a device for permission of transmission of one or more data symbols while overdriving a power amplifier of a transmitter of the device;

verifying if such permission is granted; and based on permission being granted, transmitting an indication to the device that the transmission of the one or more data symbols while overdriving a power amplifier of a transmitter of the device is allowed, wherein the overdriving is to amplify the one or more data symbols with the power amplifier and mute at least one remaining data symbol within the subframe.

11. The method according to claim 10, further comprising receiving a priority indication related to the requested transmission of the one or more data symbols, and wherein said verifying if such permission being granted is, at least partially, based on said priority indication.

12. The method according to claim 10, further comprising:

scheduling, for the one or more data symbols, frequency resources that have a non-vanishing predetermined minimum frequency spacing from a carrier band edge; and sending information regarding the scheduled frequency resources to the device.

13. The method according to claim 10, further comprising:

scheduling frequency resources for uplink transmissions such that at least one guard carrier is provided adjacent to the frequency resources scheduled for the one or more data symbols, and sending information regarding the frequency resources scheduled for the one or more data symbols to the device.

* * * * *